(12) United States Patent
Inage et al.

(10) Patent No.: US 6,892,758 B2
(45) Date of Patent: May 17, 2005

(54) CHECK VALVE WITH VIBRATION PREVENTION FUNCTION FOR VALVE BODY

(75) Inventors: Shozo Inage, Anjo (JP); Kaneyoshi Nagatani, Kariya (JP); Koji Yanai, Kariya (JP); Nobuhiko Yoshioka, Anjo (JP)

(73) Assignee: Advics Co., Ltd., Aichi-pref. (JP)

( * ) Notice: Subject to any disclaimer, the term of this patent is extended or adjusted under 35 U.S.C. 154(b) by 48 days.

(21) Appl. No.: 10/458,274

(22) Filed: Jun. 11, 2003

(65) Prior Publication Data

US 2003/0230929 A1 Dec. 18, 2003

(30) Foreign Application Priority Data

Jun. 12, 2002 (JP) .................................... 2002-171533
Jun. 12, 2002 (JP) .................................... 2002-171535
May 14, 2003 (JP) .................................... 2003-135544

(51) Int. Cl.$^7$ ............................................ F16K 15/04
(52) U.S. Cl. .................................. 137/539.5; 137/535
(58) Field of Search ........................... 137/529, 533.11, 137/533.13, 533.15, 539, 539.5, 535

(56) References Cited

U.S. PATENT DOCUMENTS

| 2,103,673 A | * | 12/1937 | Hoferer | 137/539.5 |
|---|---|---|---|---|
| 2,714,392 A | * | 8/1955 | Mercier | 137/539.5 |
| 2,914,085 A | * | 11/1959 | Mercier | 137/539.5 |
| 3,437,082 A | * | 4/1969 | Bouwkamp et al. | 137/539 |
| 3,465,787 A | * | 9/1969 | Gulick | 137/539.5 |
| 3,742,975 A | * | 7/1973 | Kazama et al. | 137/539.5 |
| 4,072,291 A | * | 2/1978 | Adams | 137/539 |
| 4,842,015 A | * | 6/1989 | Haak et al. | 137/535 |
| 6,439,263 B2 | * | 8/2002 | Schwegler et al. | 137/539.5 |
| 6,662,824 B2 | * | 12/2003 | Inage et al. | 137/539.5 |
| 2002/0079000 A1 | | 6/2002 | Inage et al. | |

* cited by examiner

Primary Examiner—John Rivell
(74) Attorney, Agent, or Firm—Posz Law Group, PLC

(57) ABSTRACT

A transmission member that transmits urging force of a helical spring to a valve body is disposed between the valve body and the helical spring. The transmission member changes a direction of an urging force transmitted to the valve body such that the urging force is oblique to a pressure action direction X. Accordingly, when a check valve is in an open state, the valve body is pressed against a side wall and thus vibration of the valve body is inhibited. Further, when the check valve is in a closed state, an angle θ formed by the direction of the urging force transmitted to the valve body and the pressure action direction X is set to be between 8 degrees and 45 degrees. Accordingly, it is possible to simultaneously realize a fluid path opening/closing function and a valve body vibration inhibition function.

5 Claims, 8 Drawing Sheets

| ANGLE θ | 4 | 8 | 16 | 20 | 30 | 40 | 45 | 50 |
|---|---|---|---|---|---|---|---|---|
| VIBRATION INHIBITION EFFECT | NO | YES | YES | YES | YES | YES | YES | CLOSED |

FIG. 5

CHECK VALVE WITH VIBRATION PREVENTION FUNCTION FOR VALVE BODY

CROSS REFERENCE TO RELATED APPLICATION

This application is based upon and claims the benefit of Japanese Patent Applications No. 2002-171533 filed on Jun. 12, 2002, No. 2002-171535 filed on Jun. 12, 2002, and No. 2003-135544 filed on May 14, 2003, the content of which are incorporated herein by reference.

FIELD OF THE INVENTION

The present invention relates to a check valve that permits flow of fluid in only one direction. More particularly, the present invention relates to a check valve that may be preferably disposed at a discharge side of a hydraulic pressure pump.

RELATED ART OF THE INVENTION

A conventional check valve for opening and closing a fluid path uses a ball that seats on and separates from a valve seat surface. The ball (valve body) is urged toward the valve seat surface (namely, in a valve closing direction) by a helical spring.

When a pressure upstream of the valve seat surface becomes higher than a pressure downstream thereof by a predetermined pressure or more, the ball separates from the valve seat surface while resisting urging force of the helical spring. Therefore, the check valve is opened such that fluid flows in a certain direction. Further, while the valve is being opened, the ball receives force generated by fluid flow and the urging force of the helical spring. The ball moves to a position at which both forces are balanced.

When the aforementioned conventional check valve is disposed, for example, at a discharge side of a pump, pulsation of a discharge pressure of the pump changes the force generated by the fluid flow that acts upon the ball. Accordingly, the position of the ball is changed, and thus the ball vibrates. This causes a problem in which the vibration of the ball amplifies pressure pulsation of the fluid.

SUMMARY OF THE PRESENT INVENTION

In view of the foregoing situation, an object of the present invention is to prevent or inhibit vibration of a valve body from amplifying pressure pulsation in a check valve for opening and closing a fluid path using a valve body that seats on and separates from a valve seat surface.

A check valve according to a first aspect of the present invention includes a case member that forms a fluid path inside the case member, a valve seat surface that is formed in the case member and disposed in the middle of the fluid path; a valve body which is disposed downstream of the valve seat surface in the fluid path and which opens and closes the fluid path by seating on and separating from the valve seat surface; and a helical spring which is disposed in the case member and urges the valve body in a valve closing direction.

Moreover, in the check valve according to the first aspect of the present invention, a wall surface is formed in the case member. When a direction of action of a pressure on the valve body of fluid upstream of the valve seat surface is assumed to be a pressure action direction X, the wall surface restricts a movement area of the valve body in a direction perpendicular to the pressure action direction X. Moreover, a transmission member that transmits urging force of the helical spring to the valve body is disposed between the valve body and the helical spring. The transmission member changes a direction of the urging force transmitted to the valve body such that the urging force is oblique to the pressure action direction X, and thus the valve body is urged toward the wall surface. Further, when the check valve is in a closed state, an angle formed by the direction of the urging force transmitted to the valve body and the pressure action direction X is set so as to be between 8 degrees and 45 degrees.

Accordingly, the valve body is urged toward the wall surface by a component of force of the urging force transmitted to the valve body. Therefore, when the valve is in an open state, the valve body is pushed against the wall surface such that vibration of the valve body is inhibited. Thus, vibration of the valve body is inhibited or prevented, and amplification of pressure pulsation is also prevented or Inhibited.

In addition, since the angle formed by the direction of the urging force transmitted to the valve body and the pressure action direction X is set so as to be between 8 degrees and 45 degrees when the check valve is in the closed state, it is possible to simultaneously realize an opening/closing function of the fluid path and a vibration inhibition function of the valve body.

In a check valve according to a second aspect of the present invention, the valve body and the transmission member are both configured by a ball. When the check valve is in the closed state, a connecting line between a center point of the valve body and a center point of the transmission member is set so as to be oblique with an angle of between 8 degrees and 45 degrees with respect to the pressure action direction X. Accordingly, it is possible to realize the same effects as the first aspect of the present invention.

In a check valve according to a third aspect of the present invention, the valve body is formed from a ball, and the transmission member is formed from an abutting surface that abuts with the valve body; a spring receiving surface that abuts with an end portion of the helical spring: and a spring guiding portion that protrudes from the spring receiving surface and is inserted within the helical spring. Further, if a contact point of the valve body and the abutting surface when the check valve is in a closed state is assumed to be a closed valve contact point, a connecting line between the closed valve contact point and the center point of the valve body is set so as to be oblique, with an angle of between 8 and 45 degrees with respect to the pressure action direction X. Accordingly, it is possible to realize the same effects as the first aspect of the present invention.

In a check valve according to a fourth aspect of the present invention, a rod acts as the transmission member and a helical compression spring as the helical spring. The rod has a spring receiving surface that abuts with an end portion of the helical compression spring. The spring receiving surface is shaped so as to widen along an urging force action direction of the helical compression spring with respect to the rod.

Accordingly, the valve body is urged toward the wall surface by a component of force of the urging force transmitted to the valve body. Therefore, when the check valve is in the open state, the valve body is pushed against the wall surface such that vibration of the valve body is inhibited. Thus, vibration of the valve body is inhibited or prevented, and as well as this, amplification of pressure pulsation is also prevented or inhibited.

As shown in FIG. 7, when a spring receiving surface 583 of a rod 580 is a flat surface perpendicular to an urging force action direction of a helical spring 560, there is a possibility that the following problem will occur. Namely, when the check valve is assembled or in operation, if a central axis of the helical spring 560 and a central axis of the rod 580 deviate from each other, the rod 580 inclines with respect to the central axis of the helical spring 560. Accordingly, the urging force of the helical spring 560 may not be transmitted correctly, or alternatively, the helical spring 560 may be subjected to offset load over a long time period, which can cause spring lifetime to be diminished.

In order to address above mentioned problem, according to a fifth aspect of the present invention, the spring receiving surface of the rod is shaped so as to widen along the urging force action direction of the helical compression spring. Therefore, as a result of a central axis alignment action of the spring receiving surface, it is possible to automatically place the central axis of the helical compression spring and the central axis of the rod in alignment with each other. Accordingly, it is possible to inhibit incorrect transmission of the urging force of the helical compression spring, and as well as this, inhibit diminishment of spring lifetime by reducing offset load that is applied to the helical compression spring.

In this case, the spring receiving surface may be a circular conical surface, or alternatively, the spring receiving surface may be a curved concave surface. Further, the spring receiving surface may be a curved convex surface.

According to a sixth aspect of the present invention, in a brake actuator which is structured such that a brake fluid pressure is transmitted from a master cylinder to a wheel cylinder so as to generate a braking force on a wheel, and which includes a pump that sucks up brake fluid at a side of the wheel cylinder of the brake actuator and discharges the sucked up brake fluid to a side of the master cylinder of the brake actuator, the check valve as described above is disposed at the discharge side of the pump. The check valve according to any one of the first to fifth aspects of the present invention may be applied as this check valve disposed at the discharge side of the brake actuator.

BRIEF DESCRIPTION OF THE DRAWINGS

Other objects, features and advantages of the present invention will be understood more fully from the following detailed description made with reference to the accompanying drawings. In the drawings:

FIG. 5 is a chart showing evaluation results of a vibration inhibition effect when an inclination angle θ is changed;

DETAILED DESCRIPTION OF THE PREFERRED EMBODIMENTS

Figure 1:
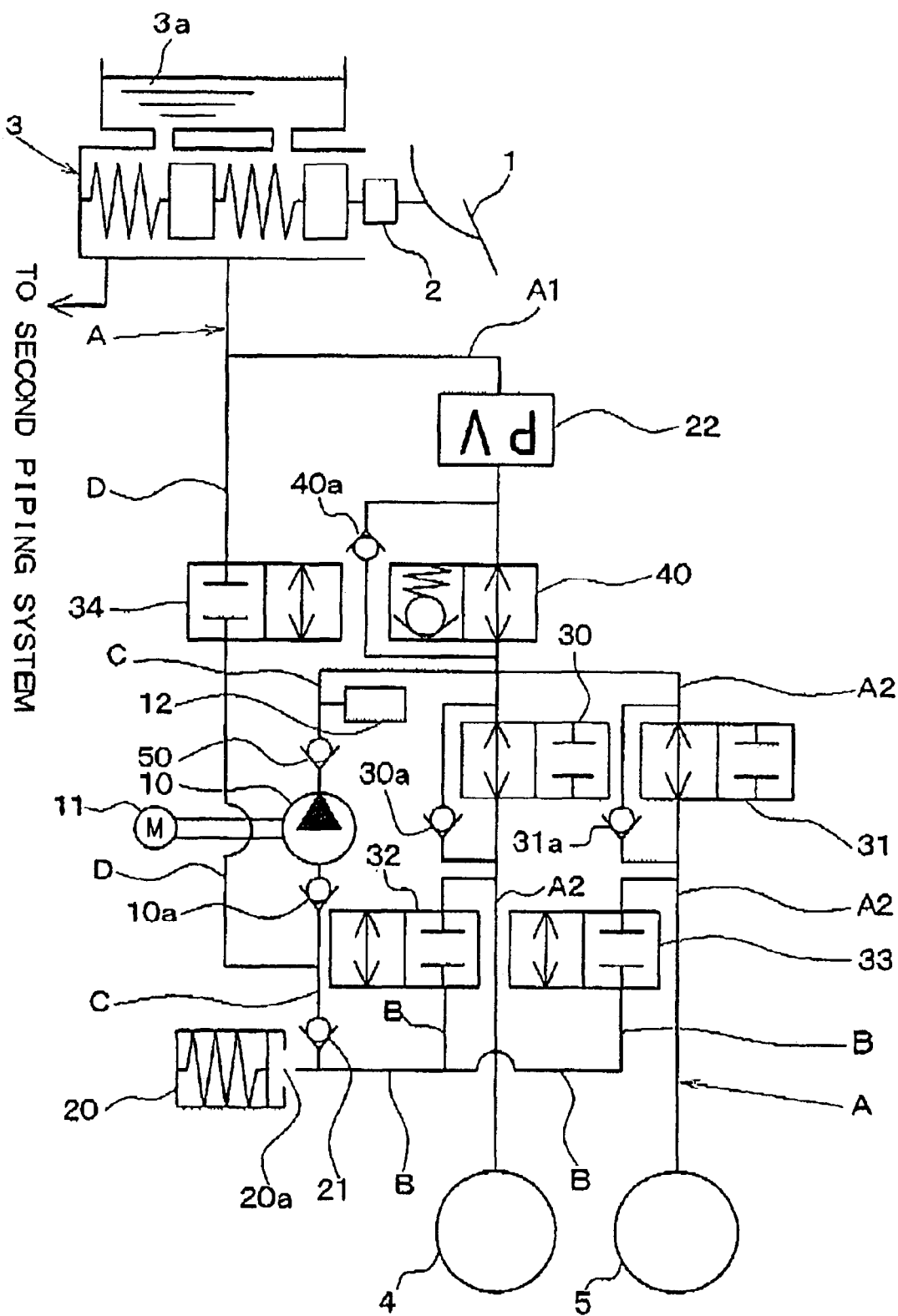
FIG. 1 is a schematic view of a piping system of a braking apparatus provided with a rotary pump according to a first embodiment of the present invention.

The present invention will be described further with reference to various embodiments in the drawings.

(First Embodiment)

Hereinafter, a first embodiment will be explained with reference to the drawings. FIG. 1 is a schematic view of a brake piping system of a braking apparatus. A fundamental configuration of the braking apparatus will be explained with reference to FIG. 1. In the first embodiment, an example will be explained in which the braking apparatus according to the present invention is applied to a four-wheeled front-wheel-drive vehicle configured with a hydraulic circuit piping X that is provided with two piping systems, these being a front-right/rear-left wheel piping system and a front-left/rear-right wheel piping system, respectively.

As shown in FIG. 1, a brake pedal 1 is connected to a booster 2, and a brake depression force is increased by the booster 2. The booster 2 has a push rod that transmits the increased brake depression force to a master cylinder 3. A master cylinder pressure is generated by the push rod pushing a master piston disposed in the master cylinder 3. The brake pedal 1, the booster 2 and the master cylinder 3 correspond to a brake fluid pressure generation portion.

The master cylinder 3 is connected to a master reservoir 3a that supplies brake fluid to the master cylinder 3 and stores excess brake fluid from the master cylinder 3.

The master cylinder pressure is transmitted to a wheel cylinder 4 for a front-right wheel FR and a wheel cylinder 5 for a rear-left wheel RL via an anti-lock braking system (hereinafter referred to as "ABS"). It should be noted that, although the following explanation will describe the front-right wheel FR and the rear-left wheel RL, the front-left wheel FL and the rear-right wheel RR that form the second piping system function in the same way, and thus a description will be omitted here.

The braking apparatus is provided with a conduit (main conduit) A connected to the master cylinder 3, and a proportioning valve 22 disposed in the conduit A. The proportioning valve 22 divides the conduit A into two sections. In other words, the conduit A is divided into: a conduit A1 that extends from the master cylinder 3 to the proportioning valve 22 and which receives the master cylinder pressure; and a conduit A2 that extends from the proportioning valve 22 to each of the wheel cylinders 4 and 5.

When brake fluid flows in a normal direction, generally, the proportioning valve 22 acts such that a standard pressure of the brake fluid is changed at a certain damping ratio and transmitted to a downstream side of the proportioning valve 22. As shown in FIG. 1, since the proportioning valve 22 is connected in reverse, the pressure of the conduit A2 is defined as the standard pressure.

Within the conduit A2, the conduit A divides into two branches. A first pressure increase control valve 30 for controlling brake fluid pressure increase to the wheel cylinder 4 is provided in one branch. In the other branch, a second pressure increase control valve 31 for controlling brake fluid pressure increase to the wheel cylinder 5 is provided.

These pressure increase control valves 30 and 31 are configured as two position valves having an opened state and a closed state which can be controlled by an electronic control unit (hereinafter referred to as "ECU") for the ABS control. When these two position valves are controlled so as to be in the opened state, the master cylinder pressure or a brake fluid pressure resulting from brake fluid discharged from pump is applied to each of the wheel cylinders 4 and 5. The pressure increase control valves 30 and 31 are controlled so as to normally be in the opened state at times of normal braking when an ABS control is not being executed.

Respective safety valves 30a and 31a are provided in parallel with the pressure increase control valves 30 and 31, such that brake fluid from the wheel cylinders 4 and 5 is discharged when brake depression is stopped and the ABS control is terminated.

Respective pressure decrease control valves 32 and 33 having an opened state and a closed state that can be controlled by the ECU for the ABS control are disposed in respective conduits B that connect a reservoir hole 20a of a reservoir 20 with the respective branches of the conduits A2 at respective points between the first and second pressure increase control valves 30 and 31 and each of the wheel cylinders 4 and 5. These pressure decrease control valves 32 and 33 are normally closed during normal braking (when the ABS control is not being executed).

A rotary pump 10 is disposed in a conduit C connecting a point of conduit A between the proportioning valve 22 and the pressure increase control valves 30 and 31 with the reservoir hole 20a of the reservoir 20. The rotary pump 10 is disposed so as to be sandwiched between sucking up side and discharge side check valves 10a and 50. When the ABS control is executed, brake fluid in the wheel cylinders 4, 5 moves the reservoir 20 during wheel cylinder pressure decrease period. Therefore, the rotary pump 10 sucks up the brake fluid In the reservoir 20 and discharges it to the conduit A2. The check valve 50 located at a discharge side of the rotary pump 10 corresponds to a check valve of the present invention.

A motor 11 is connected to the rotary pump 10 such that the rotary pump 10 is driven by the motor 11. The rotary pump is a trochoid pump or the like in which rotors thereof are abutted with each other.

In order to reduce pulsation of brake fluid discharged from the rotary pump 10, a damper 12 is disposed in the conduit C at a discharge side of the rotary pump 10. Further, a conduit (auxiliary conduit) D that connects with the master cylinder 3 is provided between the reservoir 20 and the rotary pump 10. The rotary pump 10 intakes brake fluid from the conduit A1 via the conduit D, and discharges the brake fluid to the conduit A2. Accordingly, a wheel braking force is increased by a wheel cylinder pressure of the wheel cylinders 4 and 5 being made higher than the master cylinder pressure. At this time, the proportioning valve 22 maintains a pressure difference of the master cylinder pressure and the wheel cylinder pressure.

A control valve 34 is provided in the conduit D. This control valve 34 is normally placed in an opened state during normal braking. Further, an check valve 21 is disposed between a section connecting the conduit C with the conduit D and the reservoir 20, so that reverse flow toward the reservoir 20 from the conduit C does not occur due to fluid pressure transmitted from the conduit D.

A control valve 40 is provided in the section of conduit A between the proportioning valve 22 and the pressure increase control valves 30 and 31. The control valve 40 is a two position valve that is normally placed in an opened state when the master cylinder pressure is lower than a predetermined pressure, and pressures of the wheel cylinders 4 and 5 is rapidly increased in order to brake suddenly, or when a traction control system (TCS) is executed, the control valve 40 is closed, such that a difference between a brake fluid pressure on a side of the master cylinder 3 and that on a side of the wheel cylinder 4 and 5 is maintained.

Further, the control valve 40 is arranged in parallel with the safety valve 40a, such that brake fluid pressure is applied from the side of the master cylinder 3 to the side of the wheel cylinder 4 and 5 when the control valve 40 is in the closed state.

Figure 2:
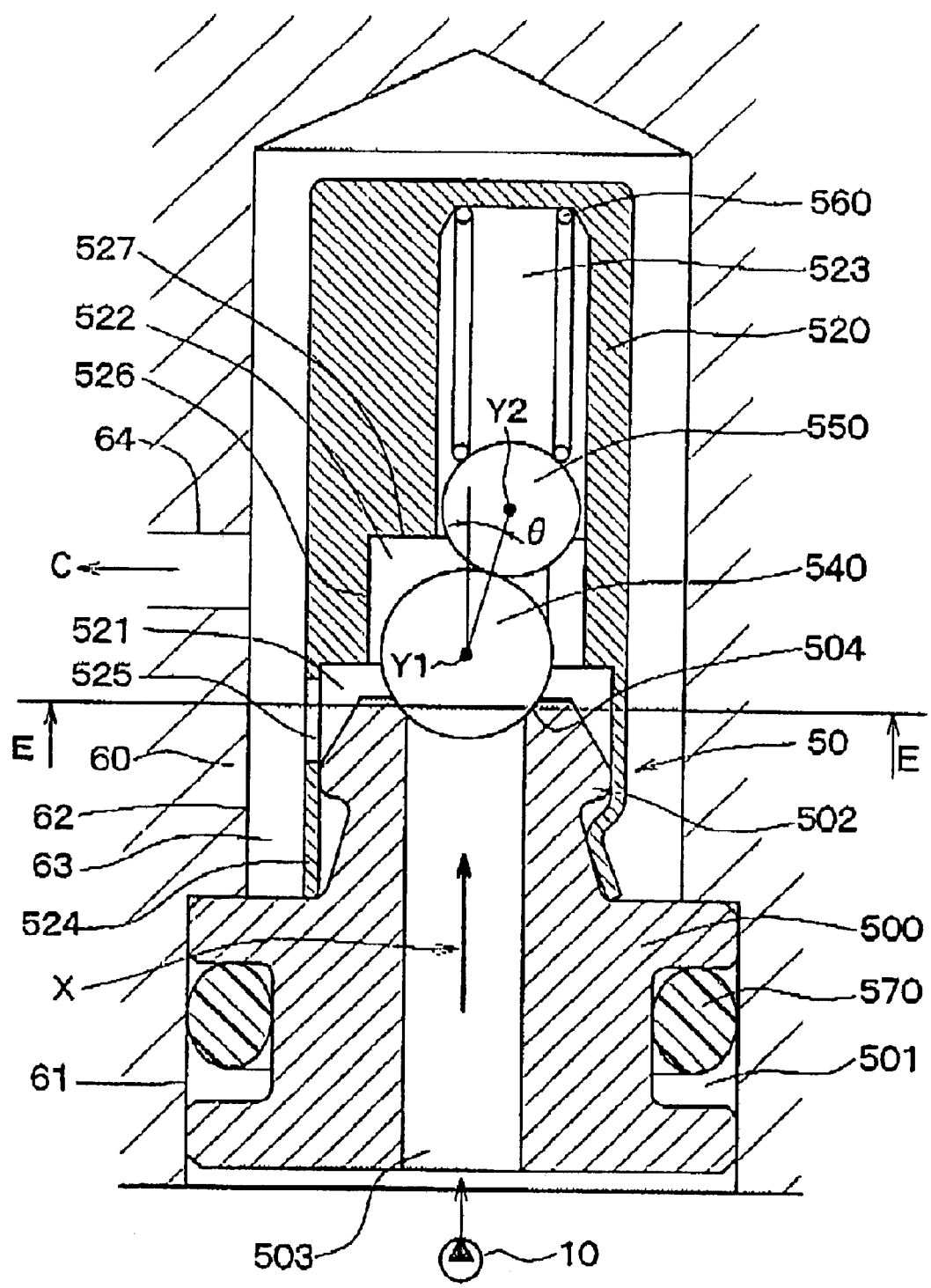
FIG. 2 is a cross sectional view of a check valve according to a first embodiment of the present invention when the check valve is closed.
Figure 3:
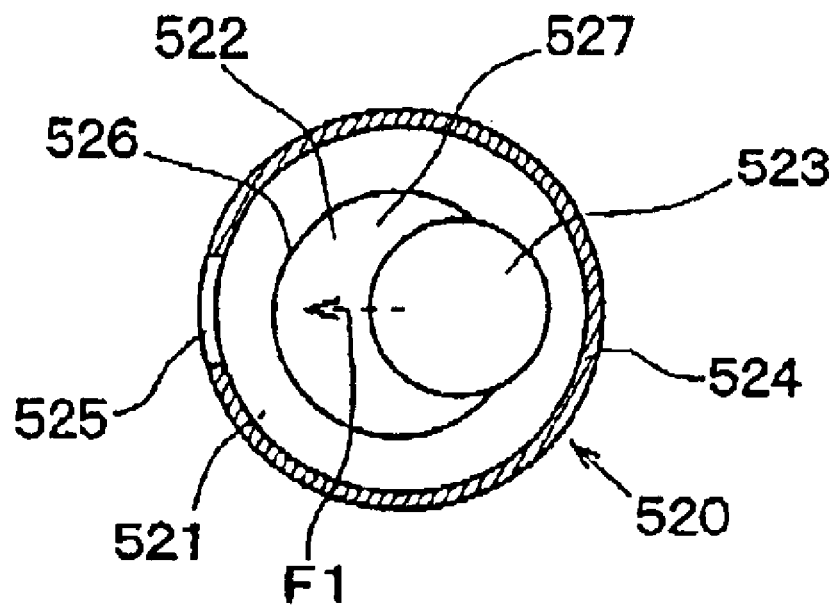
FIG. 3 is a cross sectional view taken along a line E—E of a sleeve shown in FIG. 2.
Figure 4:
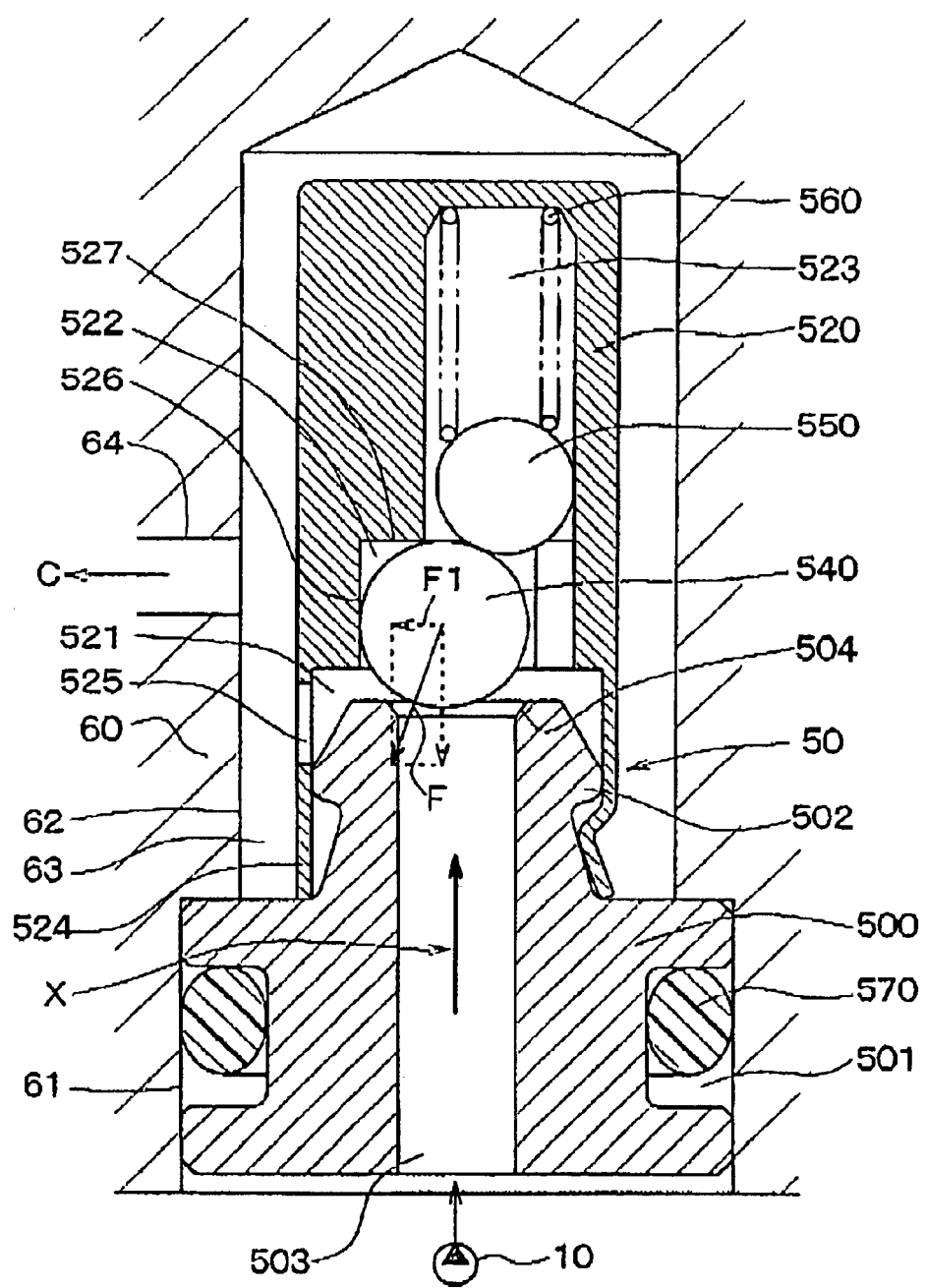
FIG. 4 is a cross sectional view of the check valve of FIG. 2 when the check valve is opened.

Hereafter, details of a check valve 50 will be explained while referring to FIGS. 2 and 3. FIG. 2 is a cross sectional view of the check valve 50 when it is closed, and FIG. 3 is a cross sectional view taken along a line E—E of a sleeve 520 shown in FIG. 2. FIG. 4 is a cross sectional view showing the check valve 50 when it is open.

The check valve 50 in FIG. 2 is assembled with various valves and the rotary pump 10 of the ABS control device, and the like, within an ABS casing 60.

More particularly, the check valve 50 is inserted within large diameter and small diameter stepped holes 61 and 62 of the casing 60. A seat 500 of the check valve 50 is press inserted into the large diameter stepped hole 61 of the casing 60, such that the check valve 50 is fixed within the casing 60.

Meanwhile, a chamber 63 that acts as a path for the brake fluid is created between the smaller diameter stepped hole 62 of the casing 60 and an outer peripheral surface of the sleeve 520 of the check valve 50. The chamber 63 communicates with a passage hole 64 formed in the casing 60. Note that the passage hole 64 constitutes a part of a conduit C provided in the ABS control device.

The brake fluid discharged from the rotary pump 10 passes through the check valve 50, flows into the chamber 63, and then into the passage hole 64.

The check valve 50 in FIGS. 2 and 3 includes the seat 500, the sleeve 520, first and second balls 540 and 550, a helical spring 560, and an O-ring 570. The O-ring 570 is made of rubber, and the rest of the structural members are made of metal. More particularly, the helical spring 560 is a cylindrical helical compression spring.

A profile of the seat 500 constituting the case member is substantially a stepped cylindrical shape. A groove 501 is formed on an outer peripheral surface of a large diameter portion of the seat 500 into which the O-ring 570 is inserted, while a protruding portion 502 is formed on an outer peripheral surface of a small diameter portion of the seat 500 so as to protrude outwardly in a radial direction thereof.

A circular passage hole 503 is formed at a central portion in the radial direction of the seat 500 so as to pass through the seat 500 in a axial direction thereof. A conical valve seat surface 504 is formed at an opening portion downstream of the passage hole 503 such that the passage hole 503 can act as a path for the brake fluid.

The first ball 540 that acts as a valve body is disposed downstream of the valve seat surface 504, so as to face the valve seat surface 504. The pressure of the brake fluid upstream (hereinafter referred to as an "upstream brake fluid pressure") of the valve seat surface 504 acts on the first ball 540 so as to displace the first ball 540 and open the check valve 50. Meanwhile, a direction in which the upstream brake fluid pressure of the valve seat surface 504 acts on the first ball 540 will be hereafter referred to as a "pressure action direction X." The pressure action direction X is parallel with the axis line of the passage hole 503 and the valve seat surface 504.

Stepped hollow portions, specifically, three cylindrical hollow portions 521 to 523 are formed in the bottomed cylindrical sleeve 520 that constitutes the case member. Among these hollow portions 521 to 523, the first hollow portion 521 is disposed at an opening end portion side of the sleeve 520. The first hollow portion 521 is formed at a radial direction center portion of the sleeve 520 so as to serve as a path for the brake fluid. The first hollow portion 521 is surrounded by a thin cylindrical portion 524. The cylindrical portion 524 is formed with one opening portion 525 that communicates the interior and exterior of the cylindrical portion 524 and acts as a path for the brake fluid. Further, the opening portion 525 is disposed in a direction of component force F1 which acts in a direction perpendicular to the pressure action direction X, which is one of component forces of a spring force F to be described later (see FIG. 4).

The second hollow portion 522 is positioned closer to a bottom portion of the sleeve 520 than the first hollow portion 521, and has a smaller diameter than the first hollow portion 521. The second hollow portion 522 is formed coaxially with the sleeve 520. Further, the second hollow portion 522 is surrounded by an inner peripheral side wall surface 526 and a bottom portion wall surface 527. The inner peripheral side wall surface 526 extends in a direction perpendicular to the pressure action direction X, while the bottom portion wall surface 527 is positioned on the side of an extension line of the pressure action direction X. The inner peripheral side wall surface 526 and the bottom portion wall surface 527 of the second hollow portion 522 restrict a movement area of the first ball 540.

Further, the third hollow portion 523 is positioned to a side of a bottom portion of the second hollow portion 522. The third hollow portion 522 has a smaller diameter than the second hollow portion 522 and is formed so as to be eccentric with respect to an axis of the sleeve 520. The second ball 550 and the helical spring 560 are disposed within the third hollow portion 523.

The second ball 550 acts as a transmission member for transmitting urging force of the helical spring 560 to the first ball 540. Accordingly, the second ball 550 is disposed between the helical spring 560 and the first ball 540. Further, the configuration is such that the urging force of the helical spring 560 acts on the first ball 540 via the second ball 550 so as to displace the first ball 540 and close the check valve 50.

After housing the first and second balls 540 and 550, and the helical spring 560 in the sleeve 520, three points closer to the opening end portion of the cylindrical portion 524 are deformed so as to engage the cylindrical portion 524 with the protruding portion 502. Accordingly, the seat 500 is integrated with the sleeve 520.

Next, an operation of the check valve 50 with the above structure will be explained while referring to FIGS. 2 to 34. During the ABS control or the like, the rotary pump 10 is operated to suck up and discharge the brake fluid. The discharged brake fluid flows to the discharge side passage hole 503 of the check valve 50. Moreover, the brake fluid pressure acts on the first ball 540 in the pressure action direction X.

When the first ball 540 is moved in a valve opening direction (refer to FIG. 4) in resistance to the urging force of the helical spring 560, the brake fluid that flows into the passage hole 503, passes through the first hollow portion 521, the opening portion 525, and the chamber 63, and then flows into the passage hole 64.

It should be noted that since the third hollow portion 523 in which the helical spring 560 and the second ball 550 are disposed is eccentric with respect to the axial direction of the passage hole 503, a connecting line between a center point Y1 of the first ball 540 and a center point Y2 of the second ball 550 is oblique (not parallel) to the pressure action direction X. Accordingly, a direction of a spring force F transmitted to the first ball 540 from the helical spring 560 is changed by the second ball 550 such that the direction of the spring force F transmitted to the first ball 540 is oblique to the pressure action direction X.

Accordingly, when the check valve 50 is opened as shown in FIG. 4, the first ball 540 is pressed against the inner peripheral side wall surface 526 by the component force F1 which acts in the direction perpendicular to the pressure action direction X. This component force F1 is one of the component forces of the spring force F (hereafter referred to as "perpendicular direction component force F1"). Accordingly, vibration of the first ball 540 is inhibited.

Therefore, even when the force generated by the flow of the brake fluid that acts on the first ball 540 changes due to pulsation in a pump discharge pressure, vibration of the first ball 540 is inhibited. Accordingly, amplification of pressure pulsation caused by vibration of the first ball 540 is also inhibited.

Moreover, investigation was conducted concerning the appropriate range of the angle of inclination θ of the connecting line between the center point Y1 of the first ball 540 and the center point Y2 of the second ball 550 and the pressure action direction X, when the check valve 50 is closed as shown in FIG. 2. In other words, this angle of inclination θ is the angle formed by the direction of the urging force transmitted to the first ball 540 and the pressure action force X, when the check valve 50 is closed.

The results are as shown in FIG. 5. When the angle of inclination θ is 4 degrees a vibration inhibition effect of the first ball 540 is not obtained. Further, when the angle of inclination θ is 50 degrees, operation is unstable, and a closed state is not maintained. On the other hand, when the angle of inclination θ is between 8 degrees and 45 degrees it is possible to reliably maintain an opening/closing function of the fluid path, and obtain the vibration inhibition effect of the first ball 540.

Further, when the discharge pressure of the rotary pump 10 becomes higher, a lift amount of the first ball 540 increases such that the first ball 540 abuts with the bottom portion surface 527. Accordingly, the first ball 540 is pressed against the inner peripheral side wall surface 526 and a bottom portion wall surface 527, and vibration of the first ball 540 is inhibited even more reliably.

In addition, the opening portion 525 is disposed in line with the direction of the perpendicular direction component force F1. Therefore, the direction of the flow of the brake fluid that flows from the passage hole 503, through the first hollow portion 521, and then into the opening portion 525 corresponds to the perpendicular direction component force F1. Accordingly, the first ball 540 is also pressed against the inner peripheral side wall surface 526 by the force generated by the flow of the brake fluid that flows toward the opening portion 525, and vibration of the first ball 540 is inhibited even more reliably.

It should be noted that it is most effective if the opening portion 525 is disposed in line with the direction of the perpendicular direction component force F1. However, the opening portion 525 may be disposed at a position that is within plus or minus 90 degrees (preferably within plus or minus 45 degrees) with respect to a direction of the perpendicular direction component force F1 in a cross-section (shown in FIG. 3) perpendicular to the axis of the sleeve 520.

Moreover, according to the first embodiment, the second ball 550 is smaller than the first ball 540 in order to facilitate compactness of the sleeve 520. However, both the balls 540 and 550 may be of the same size. In the case that the balls 540 and 550 are of the same size, there is no need to consider the insertion order of the balls 540 and 550 when housing them within the sleeve 520. Accordingly, mistaken assembly of the balls 540 and 550 is prevented.

(Second Embodiment)

Figure 6:
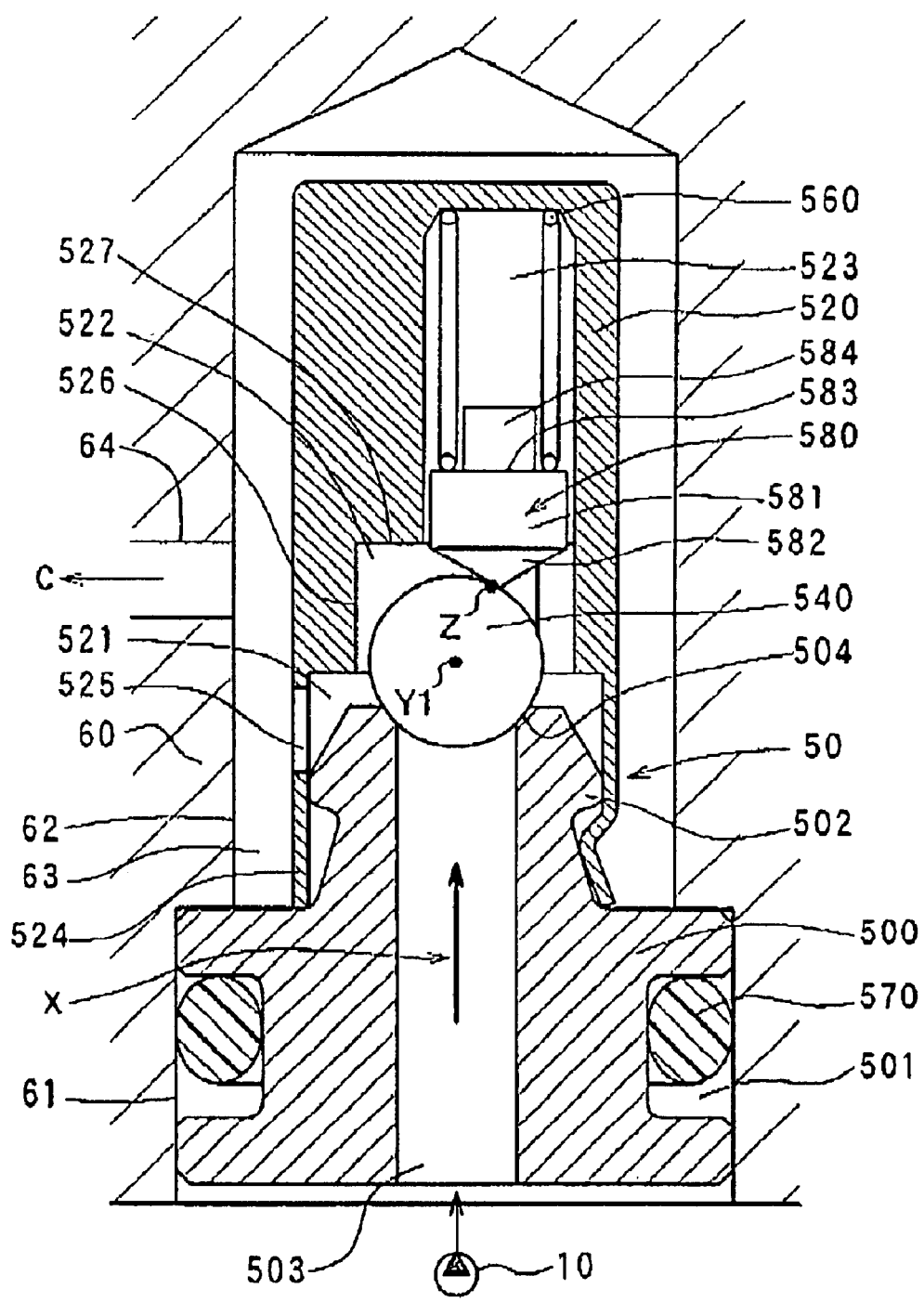
FIG. 6 is a cross sectional view of a check valve according to a second embodiment of the present Invention.

A check valve 50 according to a second embodiment of the present invention is shown in FIG. 6. The second embodiment differs from the first embodiment with respect to the fact that the second ball 550 is replaced by a rod 580. Other structural elements are the same as those of the first embodiment.

In FIG. 6 shows a closed state of the check valve 50. The rod 580 that acts as a transmission member for transmitting urging force of the helical spring 560 to the first ball 540 is substantially a stepped cylindrical shape.

More specifically, the rod 580 Includes a cylindrical portion 581; a cylindrical ball abutting surface 582 which is formed at one end of the cylindrical portion 581 and which abuts with the first ball 540; a spring receiving surface 583 which is formed at the other end of the cylindrical portion 581 and which abuts with an end portion of the helical spring 560; and a cylindrical spring guidance portion 584 which protrudes from the spring receiving surface 583 and which is inserted within the helical spring 560.

According to the above mentioned, configuration, a direction of the spring force F that acts upon the first ball 540 from the helical spring 560 becomes oblique to the pressure action direction X. Thus, the first ball 540 is pushed against the inner peripheral side wall surface 526 by the perpendicular direction component force F1 and vibration of the first ball 540 is inhibited.

Further, if a contact point of the first ball 540 and the ball abutting surface 582 of the rod 580 when the check valve 50 is in the closed state is assumed to be a closed valve contact point Z, a connecting line between the closed valve contact point Z and a center point Y1 of the first ball 540 is set so as to be oblique, with an angle of between 8 and 45 degrees, to the pressure action direction X. Accordingly, it is possible to reliably maintain the opening/cloning function of the fluid path while also obtaining the vibration inhibition function of the first ball 540.

It should be noted that the ball abutting surface 582 of the rod 580 may have a domed-shape.

(Third Embodiment)

Figure 7:
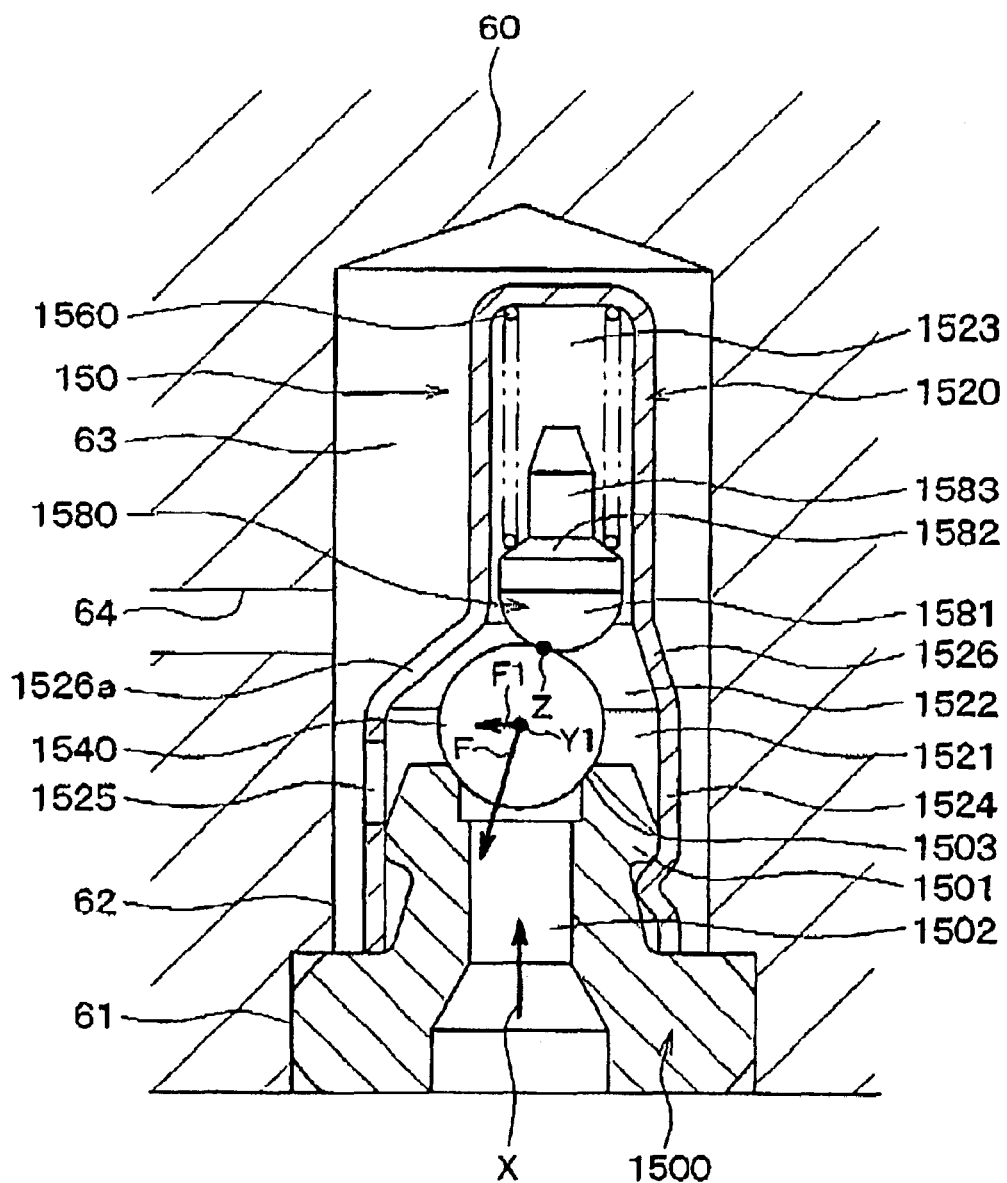
FIG. 7 is a cross sectional view of a check valve according to a third embodiment of the present invention when the check valve is closed.

A check valve 150 according to the third embodiment of the present invention is shown in FIG. 7. The figure shows a cross section of the check valve 150 when the valve is closed. The check valve 150 is utilized, like the check valve 50 of the first embodiment, as a check valve for the discharge side of the rotary pump 10.

According to this embodiment, the discharge side check valve 150 includes a seat 1500, a sleeve 1520, a ball 1540, a helical spring 1560, and a rod 1580. All of these structural members are made of metal.

A profile of the seat 1500 constituting a case member Is substantially a stepped cylindrical shape. A protruding portion 1501 is formed on an outer peripheral surface of a small diameter portion of the seat 1500 so as to protrude outwardly in the radial direction Further, a circular passage hole 1502 is formed in a central portion in the radial direction of the seat 1500 so as to pass through the seat 1500 in the axial direction. A conical valve seat surface 1503 is formed at an opening portion downstream of the passage hole 1502 such that the passage hole 1502 can serve as a path for the brake fluid.

The ball 1540 that serves as a valve body is disposed downstream of the valve seat surface 1503, so as to face the valve seat surface 1503. The upstream brake fluid pressure of the valve seat surface 1503 acts on the ball 1540 so as to displace the ball 1540 and open the check valve 150. The upstream brake fluid pressure of the valve seat surface 1503 acts on the ball 1540. At this time, the pressure action direction X is parallel with the passage hole 1502 and the axis line of the valve seat surface 1503.

The bottomed cylindrical sleeve 1520 that forms the case member is formed by press molding, for example, cold-rolled steel (SPCD). Three cylindrical hollow portions 1521 to 1523 are formed in the cylindrical sleeve 1520. Among these hollow portions 1521 to 1523, the cylindrical first hollow portion 1521 is disposed at an opening end portion side of the sleeve 1520. The first hollow portion 1521 acts as a path for the brake fluid. The first hollow portion 1521 is surrounded by a cylindrical wall surface 1524. The cylindrical wall surface 1524 is formed with one opening portion 1525 that communicates the interior and exterior of the cylindrical wall surface 1524 and acts as a path for the brake fluid. Further, the opening portion 1525 is disposed in a direction of the component force F1 that acts in a direction perpendicular to the pressure action direction X. The component force F1, as described previously, is one of the component forces of the spring force F.

Further, among the three hollow portions 1521 to 1523, the cylindrical third hollow portion 1523 is positioned furthest toward the bottom portion side of the sleeve 1520. The third hollow portion 522 has a smaller diameter than the first hollow portion 1521 and is formed so as to be eccentric to an axis of the first hollow portion 1521.

The second hollow portion 1522 is formed between the first hollow portion 1521 and the third hollow portion 1523. The second hollow portion 1522 is surrounded by a wall surface 1526. A wall surface 1526a of the wall surface 1526 is positioned in line with the direction of the perpendicular direction component force F1, namely, at the side where the opening portion 1525 is disposed. The wall surface 1526a is oblique to the pressure action direction X, with an angle of approximately 45 degrees. A movement area of the ball 1540 toward the action force direction X and a movement area of the ball 1540 toward the direction of the perpendicular direction component force F1 is restricted by this wall surface 1526a on a side of the opening portion 1525.

Further, the helical spring 1560 is disposed within the third hollow portion 1523, and the rod 1580 is disposed between the helical spring 1560 and the ball 1540. More particularly, the helical spring 1560 is a cylindrical helical compression spring.

The rod 1580 is, for example, made of carbon steel, and acts as a transmission member transmitting the urging force of the helical spring 1560 to the ball 1540. More specifically, the rod 1580 includes a dome-shaped ball abutting surface 1581 that connects with the ball 1540; a spring receiving surface 1582 that abuts with an end of the helical spring 1560; and a cylindrical spring guidance portion 1583 which protrudes from spring receiving surface 1582 and which is inserted within the helical spring 1560. The spring receiving surface 1582 is shaped so as to widen along the direction of action of the urging force of the helical spring 1560 with respect to the rod 1580, and in this embodiment is formed as a circular conical surface.

When the discharge side check valve 150 is assembled, first, while the opening end portion side of the sleeve 1520 is upward, the helical spring 1560 is inserted into the third hollow portion 1523, and then the spring guiding portion 1583 of the rod 1580 is inserted into the helical spring 1560. Next, once the ball 1540 has been housed within the sleeve 1520, the small diameter portion of the seat 1500 is inserted into the opening end portion of the sleeve 1520, and then, the sleeve 1520 is deformed at three points of the opening end portion side. Accordingly, the seat 1500 and the sleeve 1520 are integrated.

It should be noted that by inserting the spring guidance portion 1583 of the rod 1580 into the helical spring 1560, relative movement of the helical spring 1560 and the rod 1580 in the orthogonal direction with respect to the axis of the helical spring 1560 is inhibited. Therefore, when the ball 1540 is inserted in the sleeve 1520 during assembly of the check valve 150, it is possible to prevent the rod 1580 from disengaging from the helical spring 1560.

The completed check valve 150 is assembled with various valves and the rotary pump 10 of the aforementioned ABS control device, and the like, within the ABS casing 60. More particularly, the check valve 150 is inserted within the stepped holes 61 and 62 of the casing 60. At this time, the seat 1500 of the check valve 150 is press inserted into the large diameter stepped hole 61 of the casing 60, such that the check valve 150 is fixed within the casing 60 in an air-tight manner.

Meanwhile, the chamber 63 that acts as the path for the brake fluid is created between the smaller diameter stepped hole 62 of the casing 60 and an outer peripheral surface of the sleeve 1520 of the check valve 150. The chamber 63 communicates with the passage hole 64 formed in the casing 60. The brake fluid discharged from the rotary pump 10 passes through the check valve 150, flows into the chamber 63, and then into the passage hole 64.

Next, operation of the check valve 150 with the above structure will be explained while referring to FIG. 7. During the ABS control or the like, the rotary pump 10 is operated to suck up and discharge the brake fluid. The discharged brake fluid flows to the discharge side passage hole 1502 of the check valve 150, and the brake fluid pressure acts on the ball 1540 in the pressure action direction X.

When the ball 1540 is moved in the valve opening direction in resistance to the urging force of the helical spring 1560, the brake fluid that flows into the passage hole 1502 passes through the first hollow portion 1521, the opening portion 1525, and the chamber 63, and then flows into the passage hole 64.

It should be noted that since the third hollow portion 1523 in which the helical spring 1560 and the rod 1580 are disposed is eccentric to the axis of the passage hole 1502, a connecting line between an actual contact point Y of the ball contact surface 1581 of the rod 1580 and the ball 1540, and a center point Z of the ball 1540 is oblique (not parallel) to the pressure action direction X. Accordingly, a direction of the spring force F transmitted to the ball 1540 from the helical spring 1560 is changed by the rod 1580, such that the direction of the spring force F transmitted to the ball 1540 is oblique to the pressure action direction X.

Accordingly, when the check valve 150 is opened, the ball 1540 is moved toward a side of the opening portion 1525 by the perpendicular direction component force F1, and thus the ball 1540 is pressed against the wall surface 1526a of the side of the opening portion 1525. Accordingly, vibration of the ball 1540 is inhibited. Therefore, even when the force generated by the flow of the brake fluid that acts on the ball 1540 changes due to pulsation in a pump discharge pressure, vibration of the ball 1540 is inhibited. Accordingly, amplification of pressure pulsation caused by vibration of the ball 1540 is also inhibited.

In addition, the opening portion 1525 is disposed in line with the direction of the perpendicular direction component force F1. Therefore, the direction of the flow of the brake fluid that flows from the passage hole 1502, through the first hollow portion 1521, and then toward the opening portion 1525 corresponds to the perpendicular direction component force F1. Accordingly, the ball 1540 is pressed against the wall surface 1526a at the side of the opening portion 1525 by the force generated by the flow of the brake fluid that flows toward the opening portion 1525, and vibration of the ball 1540 is inhibited even more reliably.

Further, the spring receiving surface 1582 of the rod 1580 adopts the circular conical surface that widens along the urging force action direction of the helical spring 1560 with respect to the rod 1580. Therefore, as a result of the central axis alignment action of the spring receiving surface 1582, it is possible to automatically place the central axis of the helical spring 1560 and the central axis of the rod 1580 in alignment with each other. Accordingly, it is possible to inhibit incorrect transmission of the urging force of the helical spring 1560, and as well as this, inhibit diminishment of spring lifetime by reducing offset load that is applied to the helical spring 1560.

(Fourth Embodiment)

This embodiment differs from the third embodiment with respect to the fact that the spring receiving surface of the rod 1580 has a modified shape. Other structural elements are the same as those of the third embodiment.

Figure 8:
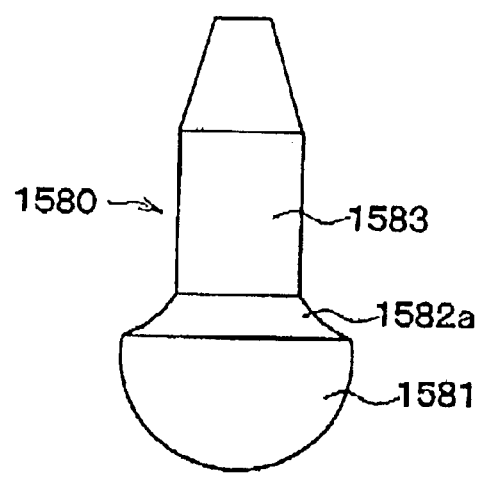
FIG. 8 is a cross section showing a main portion of a check valve according to a fourth embodiment of the present invention.

As shown In FIG. 8, a spring receiving surface 1582a of the rod 1580 in this embodiment widens along the urging force action direction of the helical spring 1560 with respect to the rod 1580. Further, this widening of the spring receiving surface 1582a is such that the degree of expansion of the spring receiving surface 1582a gradually increases. Thus, the spring receiving surface 1582a has a tapered and curved concave shape. With the spring receiving surface 1582a adopting this shape, it is also possible to automatically place the central axis of the helical spring 1560 and the central axis of the rod 1580 in alignment with each other, due to the central axis alignment action.

(Fifth Embodiment)

This embodiment differs from the third embodiment with respect to the fact that the spring receiving surface of the rod 1580 has a modified shape. Other structural elements are the same as those of the third embodiment.

Figure 9:
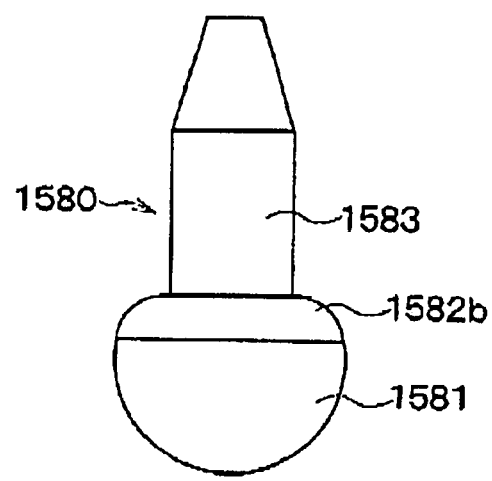
FIG. 9 is a cross section showing a main portion of a check valve according to a fifth embodiment of the present invention.

As shown in FIG. 9, a spring receiving surface 1582b of the rod 1580 in this embodiment widens along the urging force action direction of the helical spring 1560 with respect to the rod 1580. Further, this widening of the spring receiving surface 1582a is such that the degree of expansion of the spring receiving surface 1582a gradually decreases. Thus, the spring receiving surface 1582b has a curved convex shape. With the spring receiving surface 1582b adopting this shape, it is also possible to automatically place the central axis of the helical spring 1560 and the central axis of the rod 1580 in alignment with each other, due to the central axis alignment action.

(Modifications)

In the embodiments described above, examples are given in which the check valve according to the present invention is applied to a pump for a brake actuator. However, the check valve according to the present invention may be applied to a pump other than that used in a brake actuator.

Moreover, use of the check valve according to the present invention is not limited to a discharge system of a pump. The check valve may be used in any piping system in which fluid flows. Particularly, it is preferably used as a check valve in a piping system in which fluid pressure pulsation is large.

While the above description is of the preferred embodiments of the present invention, it should be appreciated that the invention may be modified, altered, or varied without deviating from the scope and fair meaning of the following claims.

What is claimed is:

1. A check valve comprising:

a case member which forms a fluid path;

a valve seat surface which is formed in the case member and disposed in the middle of the fluid path;

a valve body which is disposed downstream of the valve seat surface in the fluid path and which opens and closes the fluid path by seating on and separating from the valve seat surface; and a helical compression spring which is disposed in the case member and urges the valve body in a valve closing direction, wherein a wall surface is formed in the case member, the wall surface restricting a movement area of the valve body in a direction perpendicular to a pressure action direction X, the pressure action direction X taken as a direction of action of a pressure of a fluid upstream of the valve seat surface, a rod that transmits urging force of the helical compression spring to the valve body is disposed between the valve body and the helical compression spring, the rod changing a direction of the urging force transmitted to the valve body such that the urging force is oblique to the pressure action direction X, thus causing the valve body to be urged toward the wall surface, and the rod having a spring receiving surface that abuts with an end portion of the helical compression spring, the spring receiving surface being shaped so as to widen along the urging force action direction of the helical compression spring with respect to the rod.

2. The check valve according to claim 1, wherein the spring receiving surface is a circular conical surface.

3. The check valve according to claim 1, wherein the spring receiving surface is a curved concave surface.

4. The check valve according to claim 1, wherein the spring receiving surface is a curved convex surface.

5. A brake actuator which is structured such that a brake fluid pressure is transmitted from a master cylinder to a wheel cylinder, so as to generate a braking force on a wheel, and which includes a pump that sucks up brake fluid at a side of the wheel cylinder and discharges the sucked up brake fluid to a side of the master cylinder, wherein the check valve according to claim 1 is disposed at the discharge side of the pump.

* * * * *